United States Patent
Takano et al.

(10) Patent No.: US 8,619,510 B1
(45) Date of Patent: Dec. 31, 2013

(54) METHOD FOR MEASUREMENT OF MAGNETIC FIELD GRADIENT OF RECORDING MAGNETIC FIELD GENERATED BY MAGNETIC HEAD

(75) Inventors: Ken-ichi Takano, Tokyo (JP); Satoshi Tomikawa, Tokyo (JP); Tomohito Mizuno, Tokyo (JP); Hiroshi Kiyono, Tokyo (JP)

(73) Assignee: TDK Corporation, Tokyo (JP)

( * ) Notice: Subject to any disclaimer, the term of this patent is extended or adjusted under 35 U.S.C. 154(b) by 11 days.

(21) Appl. No.: 13/600,326

(22) Filed: Aug. 31, 2012

(51) Int. Cl.
*G11B 11/00* (2006.01)

(52) U.S. Cl.
USPC ..................... 369/13.17; 369/13.14

(58) Field of Classification Search
USPC ............................ 369/13.14, 13.17
See application file for complete search history.

(56) References Cited

FOREIGN PATENT DOCUMENTS

JP    A-2008-097709    4/2008

*Primary Examiner* — Wayne Young
*Assistant Examiner* — Brenda Bernardi
(74) *Attorney, Agent, or Firm* — Posz Law Group, PLC

(57) ABSTRACT

A measurement method of a magnetic field gradient of a recording magnetic field generated by a magnetic head in a recording medium includes a step of locally heating the recording medium in a nonmagnetic field state where a magnetic field is not applied to the recording medium at all and measuring a temperature gradient of the recording medium in the nonmagnetic field state, a step of locally heating the recording medium in a recording magnetic field application state where the recording magnetic field is applied to the recording medium and measuring a temperature gradient of the recording medium in the recording magnetic field application state, and a step of calculating a magnetic field gradient of the recording magnetic field based on the temperature gradient of the recording medium in the nonmagnetic field state and the temperature gradient of the recording medium in the recording magnetic field application state.

9 Claims, 7 Drawing Sheets

METHOD FOR MEASUREMENT OF MAGNETIC FIELD GRADIENT OF RECORDING MAGNETIC FIELD GENERATED BY MAGNETIC HEAD

BACKGROUND OF THE INVENTION

1. Field of the Invention

The present invention relates to a method for measurement (measurement method) of a magnetic field gradient. In particular, the present invention relates to a measurement method of a magnetic field gradient of a recording magnetic field in a recording medium, the recording magnetic field being generated by a magnetic head that writes information to the recording medium using a thermally-assisted magnetic recording system.

2. Description of the Related Art

In recent years, higher recording density of a hard disk drive (HDD) has been demanded, and a perpendicular magnetic recording system has been adopted as its recording system. In the perpendicular magnetic recording system, a magnetization direction of a recording bit (magnetic domain) is perpendicular to a recording medium. Thereby, the magnetic domain size is decreased and higher recording density is realized.

Generally, when the magnetic domain size is miniaturized, along with a volume decrease in magnetic particles that configure the recording medium, a problem of thermal stability of a recording magnetization occurs. In other words, due to "thermal fluctuation" of the magnetization, information recorded in the recording medium may be lost. The same things occur also in the perpendicular magnetic recording system. As a method to resolve this problem of thermal stability, it can be considered to use a material having large magnetic anisotropy for the recording medium. However, in order to write information (that is, to perform magnetization reversal) to such recording medium, an extremely large recording magnetic field (writing magnetic field) generated by a magnetic head is needed. This may not allow stable writing to be performed in some occasions.

In order to perform stable writing to a recording medium formed of a material having large magnetic anisotropy, a recording system called as a thermally-assisted magnetic recording system has been proposed. According to the recording system, by heating a portion of the recording medium to which information should be written, coercive force of the portion can be decreased and a recording magnetic field needed for magnetization reversal can be decreased. As a result, stable writing becomes possible.

For further increase in recording density, it is necessary to narrow a magnetization reversal width (magnetization transition width) in a track width direction. In the perpendicular magnetic recording system, a magnetization transition width $\delta$ is expressed as follows by using a coercive force distribution $\Delta H_C$ of the recording medium and a magnetic field gradient $dH_h/dx$ of a writing magnetic field, which is generated by the magnetic head, in the recording medium.

$$\delta = \frac{\Delta H_C}{\left(\frac{dH_h}{dx}\right)} \quad (1)$$

On the other hand, a magnetization transition width $\delta$ in the thermally-assisted magnetic recording system is given by $$\delta = \frac{\Delta H_C}{\left(\frac{dH_C}{dT} \cdot \frac{dT}{dx}\right) + \left(\frac{dH_h}{dx}\right)}. \quad (2)$$

Herein, $dH_C/dT$ is a temperature gradient of coercive force of the recording medium, and $dT/dx$ is a temperature gradient of the recording medium.

In the thermally-assisted magnetic recording system, normally, a method of heating the recording medium by irradiating the recording medium with light of near-field light is used. In this method, a steep temperature gradient can be generated on a surface of the recording medium. Therefore, the magnetization transition width $\delta$ is expected to be narrowed by combining a recording medium having a large temperature gradient of coercive force. Also in this point, the thermally-assisted magnetic recording system is advantageous as compared with the perpendicular magnetic recording system.

For design of a magnetic head and a recording medium that realize higher recording density, it is important to know a magnetization transition width itself. According to the above-described expression, the magnetization transition width can be calculated using a magnetic field gradient (recording magnetic field gradient) of a writing magnetic field generated by the magnetic head. However, because a measurement (calculation) method of the recording magnetic field gradient has not been established, actual measurement thereof is difficult. In the present state, the recording magnetic field gradient is treated as a prediction value by a calculator simulation. However, it is not more than a prediction value, and it cannot be said that the prediction value is sufficient to obtain an actual recording magnetic field gradient.

SUMMARY OF THE INVENTION

The present invention relates to a measurement method of a magnetic field gradient of a recording magnetic field, which is generated by a magnetic head that writes information to the recording medium by using a thermally-assisted magnetic recording system, in a recording medium. An objective of the present invention is to provide a measurement method of a magnetic field gradient from which a magnetic field gradient of a recording magnetic field can be obtained without usage of a calculator simulation.

According to an embodiment of the present invention, a measurement method of a magnetic field gradient of a recording magnetic field generated by a magnetic head in a recording medium includes a step of locally heating the recording medium in a nonmagnetic field state where a magnetic field is not applied to the recording medium at all and measuring a temperature gradient of the recording medium in the nonmagnetic field state, a step of locally heating the recording medium in a recording magnetic field application state where the recording magnetic field is applied to the recording medium and measuring a temperature gradient of the recording medium in the recording magnetic field application state, and a step of calculating a magnetic field gradient of the recording magnetic field based on the temperature gradient of the recording medium in the nonmagnetic field state and the temperature gradient of the recording medium in the recording magnetic field application state.

In such measurement method, both a temperature gradient of a recording medium in a nonmagnetic field state and a temperature gradient of a recording medium in a recording magnetization application state are experimentally measurable. Therefore, a magnetic field gradient of a recording magnetic field can be experimentally directly obtained.

As described above, the measurement method of a magnetic field gradient from which a magnetic field gradient of a recording magnetic field can be obtained without usage of a calculator simulation can be provided.

The above description, as well as other objects, features, and advantages of the present invention, will be evident by the description that follows below with reference to attached drawings exemplifying the present invention.

DESCRIPTION OF THE PREFERRED EMBODIMENTS

Figure 1:
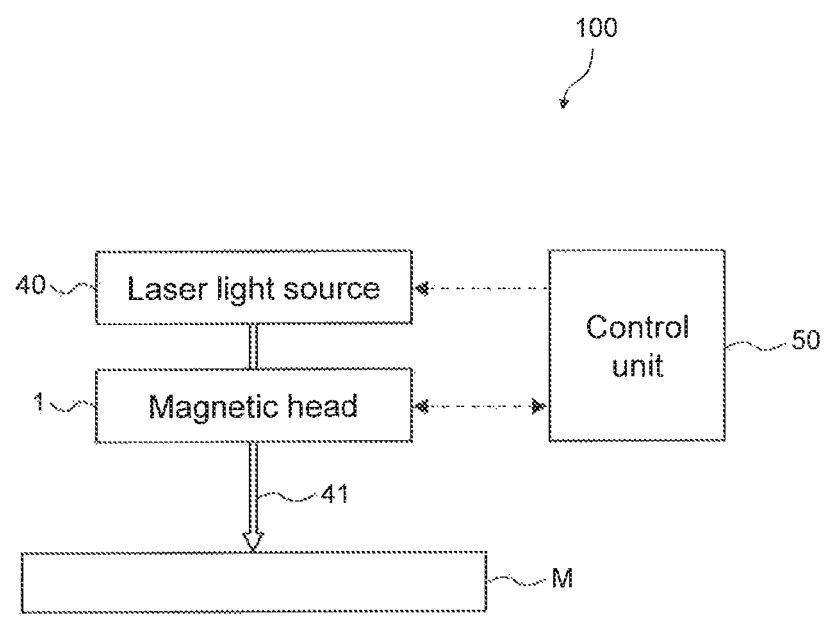
FIG. 1 is a block diagram that illustrates a main configuration of a magnetic disk device according to one embodiment of the present invention.

First, with reference to FIG. 1, a magnetic disk device according to one embodiment of the present invention is explained. FIG. 1 is a block diagram that illustrates a main configuration of the magnetic disk device according to the present embodiment.

In FIG. 1, a magnetic disk device 100 according to the present embodiment is provided with a recording medium M, a magnetic head 1 that performs recording and writing of information to the recording medium M, a laser light source 40 that generates laser light 41 for thermally-assisted magnetic recording, which will be described later, and a control unit 50 that controls the magnetic head 1 and the laser light source 40.

The magnetic head 1 is provided to a slider (not illustrated) elastically supported by a suspension (not illustrated). Thereby, during an operation of the magnetic disk device 100, the magnetic head 1 can fly on a surface of the recording medium M. The magnetic head 1 functions as a magnetic head that writes information to the recording medium using a thermally-assisted magnetic recording system as will be described later.

As will be described later, the control unit 50 controls the magnetic head 1 and the laser light source 40, and measurement of a magnetic field gradient of a recording magnetic field generated by the magnetic head 1 can be performed. Also, based on the measured magnetic field gradient of the recording magnetic field, the control unit 50 can perform a self-diagnosis of the magnetic disk device 100 and a control of magnetic recording operation.

Figure 2:
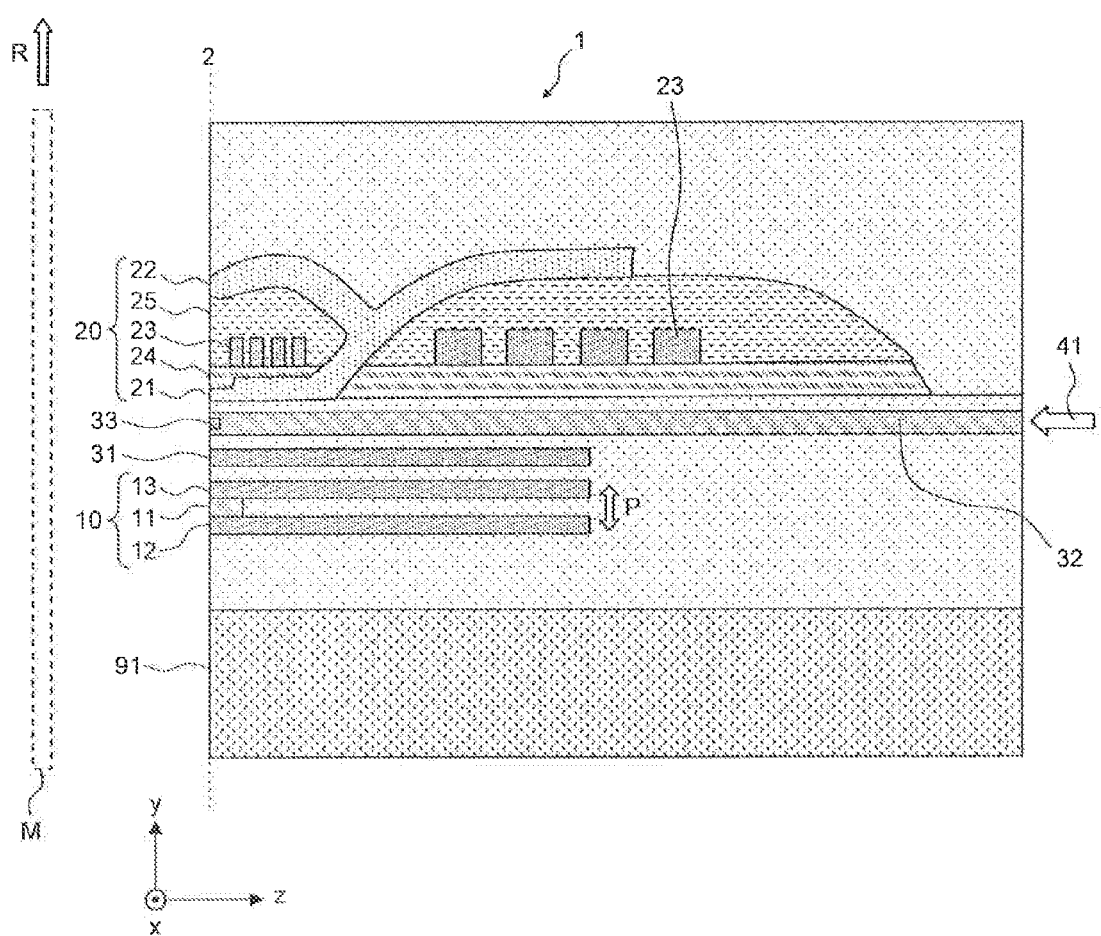
FIG. 2 is a lateral cross-sectional view illustrating a magnetic head according to the embodiment of the present invention.

FIG. 2 is a lateral cross-sectional view of the magnetic head according to the present embodiment. FIG. 2 illustrates a cross section in a direction perpendicular to a surface of the magnetic head 1 facing the recording medium M, which is a surface 2 called as an air bearing surface (ABS). It should be noted that a size ratio among members in each of the drawings may be different from actual size to obtain easy view of the drawings.

The magnetic head 1 is a composite head including a reading part 10 that reads information from the recording medium M and a writing part 20 that writes information to the recording medium M. The reading part 10 and the writing part 20 are arranged along a moving direction of the recording medium M, which is indicated by an arrow R in the figure, and configure portions of the air bearing surface 2. Between the reading part 10 and the writing part 20, an interelement shield layer 31 formed by sputtering, plating, etc. is provided.

The reading part 10 includes a magnetoresistive effect (MR) element 11 and first and second shield layers 12 and 13 that are provided on both sides of the MR element 11 in a film surface orthogonal direction P so as to sandwich the MR element 11. The first and second shield layers 12 and 13 also function as electrodes to flow a sense current in the film surface orthogonal direction P of the MR element 11. Therefore, the MR element 11 is an element that has a current perpendicular to the plane (CPP) structure in which a sense current flows in a direction orthogonal to a film surface of the element. As the MR element 11, a CPP-giant magneto-resistance (GMR) element made by applying a CPP structure to a GMR element using a GMR effect and a tunnel magneto-resistance (TMR) element using a TMR effect are preferably used.

The writing part 20 has a configuration for a so-called perpendicular magnetic recording. A magnetic pole layer that generates a writing magnetic field (recording magnetic field) is formed from a main magnetic pole layer 21 and an auxiliary magnetic pole layer 22. These magnetic pole layers 21 and 22 are made by a frame plating method, etc. The main magnetic pole layer 21 is formed of CoFe, and is exposed on the air bearing surface 2 in a direction substantially orthogonal to the air bearing surface 2. In the periphery of the main magnetic pole layer 21, a coil layer 23 extending on a gap layer 24 formed of an insulation material is wound, and a magnetic flux is induced to the main magnetic pole layer 21 by the coil layer 23. The coil layer 23 is formed by a frame plating method, etc. The magnetic flux is induced inside the main magnetic pole layer 21 and is emitted toward the recording medium M from the air bearing surface 2.

The auxiliary magnetic pole layer 22 is a magnetic layer magnetically coupled with the main magnetic pole layer 21. The auxiliary magnetic pole layer 22 is a magnetic layer that is formed of an alloy formed of two or three of Ni, Fe, and Co, etc. and that has a film thickness of approximately 0.01 μm—approximately 0.5 μm. The auxiliary magnetic pole layer 22 is provided so as to branch from the main magnetic pole layer 21, and faces the main magnetic pole layer 21 through the gap layer 24 and a coil insulation layer 25 on an air bearing surface 2 side.

Between the writing part 20 and the interelement shield layer 31, a waveguide 32 for guiding laser light 41 from a laser light source 40 to the air bearing surface 2 side and a near-field light generation part 33 that generates near-field light for heating the recording medium M by using the laser light 41 are provided. An end of the near-field light generation part 33 also configures a portion of the air bearing surface 2.

As described above, the magnetic head 1 is formed to fly on the surface of the moving recording medium M during reading or writing. In this state, the reading part 10 performs reading by sensing a magnetic field due to a recording magnetization of the recording medium M, and the writing part 20 performs writing by applying a writing magnetic field to the recording medium M. During the writing, laser light 41 that has propagated through the waveguide 32 from the laser light source 40 radiates to the near-field light generation part 33, and due to the radiation, near-field light is generated from an end part of the near-field light generation part 33 that reaches the air bearing surface 2. The near-field light reaches the surface of the recording medium M and heats the portion. Thereby, coercive force of the heated portion decreases to an amount that allows writing to be performed, and as a result, thermally-assisted magnetic recording can be performed.

Figure 3:
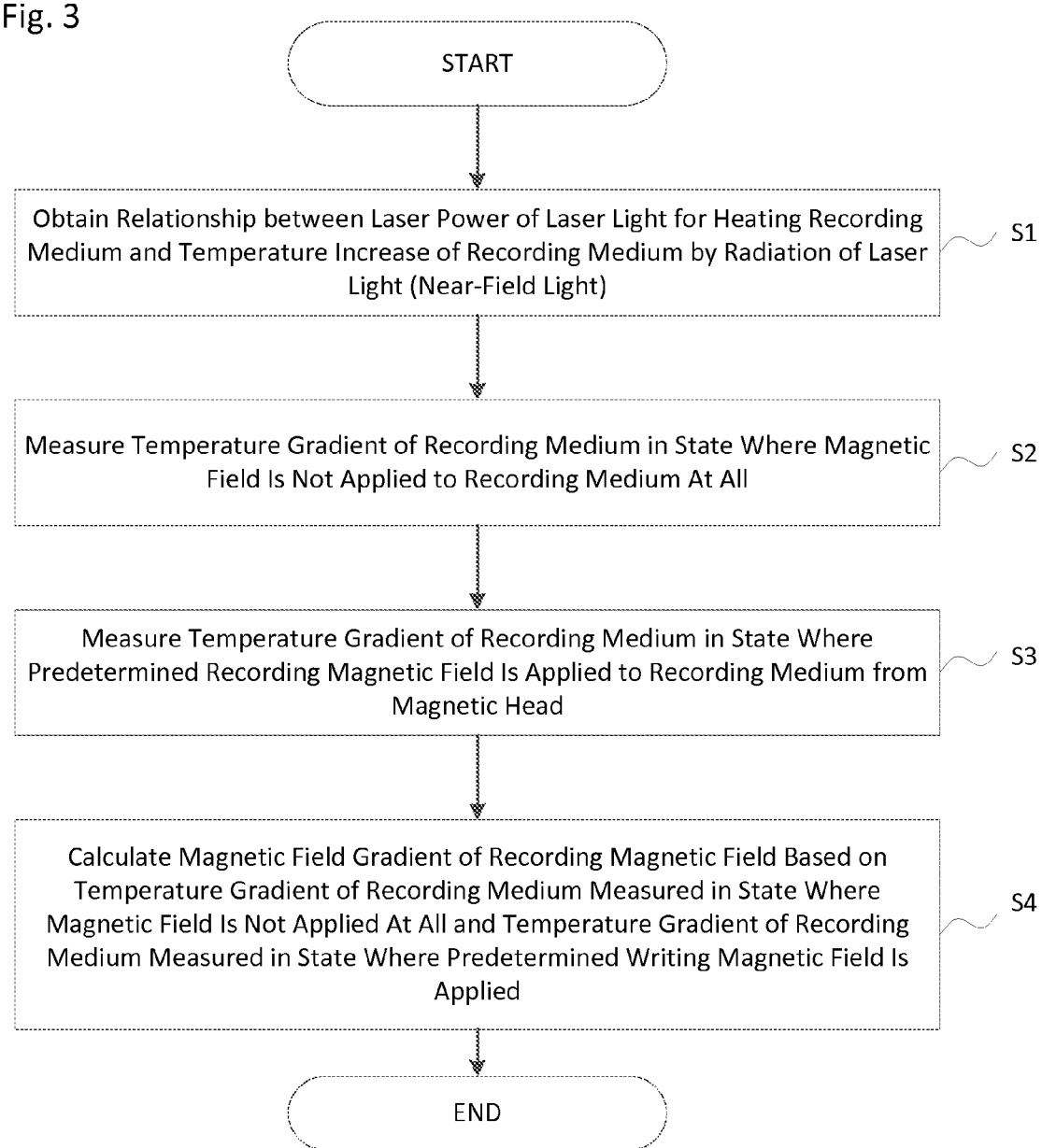
FIG. 3 is a flow diagram for explaining a measurement method of a magnetic field gradient of a recording magnetic field according to the embodiment of the present invention.

Next, as following a flow diagram illustrated in FIG. 3, an explanation is given of a measurement method of a magnetic field gradient (recording magnetic field gradient) of a writing magnetic field generated by the magnetic head in the magnetic disk device according to the present embodiment.

Figure 4:
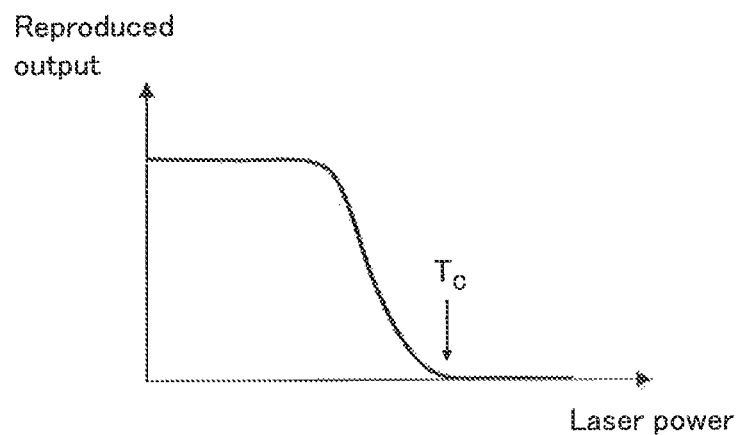
FIG. 4 is a drawing that illustrates the relationship between the laser power of a laser light source and the reproduced output of the magnetic head.

(Step S1) At first, in a state where a magnetic field is not applied at all (nonmagnetic field state), the relationship between the laser power of laser light for heating the recording medium and the temperature increase of the recording medium due to radiation of laser light (near-field light) is obtained. Specifically, magnetization recorded to the recording medium is read by the magnetic head while the recording medium is heated as laser power is changed, and laser power when a reproduced output thereof becomes zero is determined. The laser power at this time corresponds to a temperature at which recording magnetization is erased, that is a Curie temperature of magnetic particles that configure the recording medium. FIG. 4 is a graph in which the relationship between the laser power and the reproduced output is plotted. FIG. 4 shows a situation where the reproduced output decreases as the laser power increases and the reproduced output is zero at a Curie temperature $T_C$.

Note, a method for measuring the relationship between the laser power and the Curie temperature is not limited to the above-described method. For example, a Curie temperature can also be determined from a reproduced output, a media noise, or a signal to noise ratio (SNR), etc. The SNR mentioned herein is a ratio of a reproduction signal to a total noise (media noise, head noise, amplifier noise, etc.).

Figure 5:
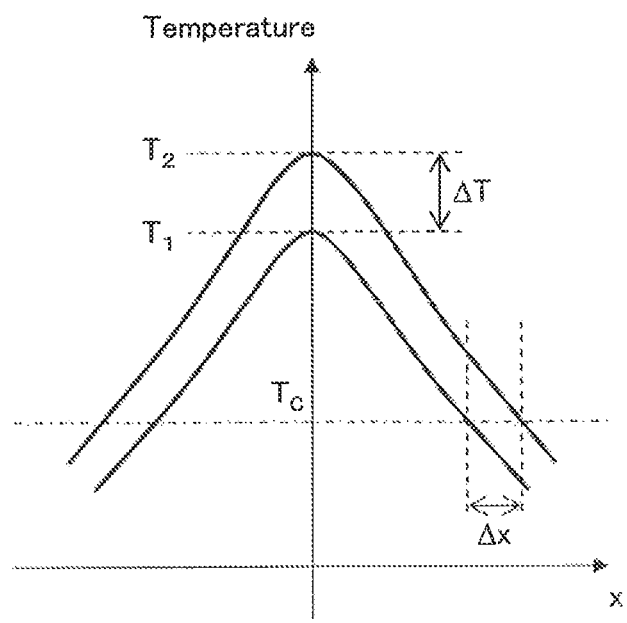
FIG. 5 is a drawing for explaining a measurement method of a temperature gradient of a recording medium in a non-magnetic field state.

(Step S2) Next, in a nonmagnetic field state, a temperature gradient of the recording medium when the recording medium is locally heated with laser light is measured. FIG. 5 is a graph for explaining the measurement method of the temperature gradient of the recording medium in S2. The lateral axis indicates the position of the recording medium in the track width direction, and the horizontal axis indicates the temperature of the recording medium at the position.

Specifically, at first, a predetermined point of the recording medium is irradiated with laser light. Then, in a state where the predetermined point is heated to a temperature $T_1$, recording magnetization of the recording medium is read by the magnetic head, and a thermal erasure width (TEW) where recording magnetization is thermally erased around the predetermined point is measured. The TEW corresponds to a region of the recording medium heated to the Curie temperature $T_C$ or more. In other words, a temperature at a border position (recording point) where recording magnetization is thermally erased corresponds to the Curie temperature $T_C$.

Thereafter, using the relationship between the laser power and the temperature of the recording medium, which has been obtained in S1, the recording medium is locally heated such that the temperature of the predetermined point becomes $T_2$ from $T_1$. Then, a TEW is measured in the same way. Along with the temperature increase of the entire recording medium, a region heated to the temperature $T_C$ or more, which is the TEW, becomes wider than that of the case of the temperature $T_1$. Therefore, the recording point moves outward, and changes by only $\Delta x$ as illustrated in FIG. 5. From the temperature change $\Delta T(=T_2-T_1)$ of the recording medium and the change amount $\Delta x$ of the measured recording point, a temperature gradient $dT/dx$ of the recording medium is estimated.

Figure 6:
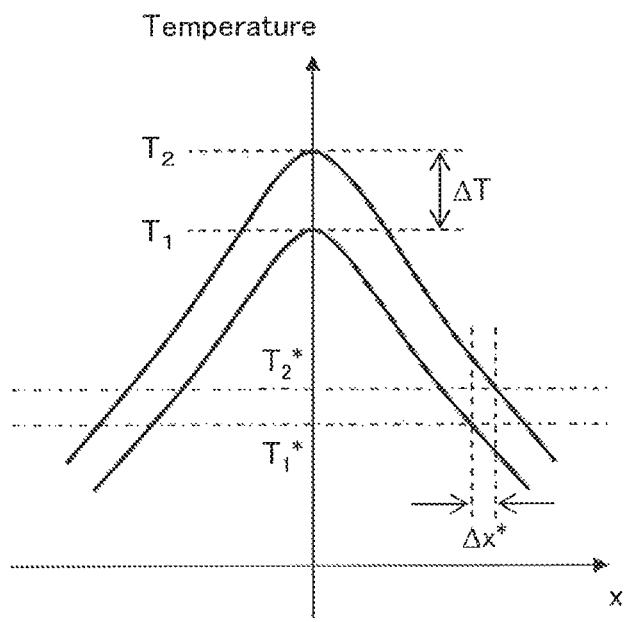
FIG. 6 is a drawing for explaining a measurement method of a temperature gradient of a recording medium in a state where the recording medium has a magnetic field gradient.

(Step S3) Next, in a state where a predetermined recording magnetic field is applied to the recording medium by the magnetic head, that is in a state where the recording medium has a magnetic field gradient therein, a temperature gradient of the recording medium when the recording medium is locally heated by laser light is measure in the same way as S2. FIG. 6 is a graph for explaining a measurement method of the temperature gradient of the recording medium in S3. The lateral axis indicates the position of the recording medium in the track width direction, and the horizontal axis indicates the temperature of the recording medium at the position.

Specifically, at first, a predetermined point of the recording medium is irradiated with laser light. Then, in a state where the predetermined point is heated to the temperature $T_1$, recording magnetization of the recording medium is read by the magnetic head, and a thermomagnetic erasure width (TMEW) where recording magnetization is thermomagnetically erased around the predetermined point is measured. At this time, because a recording magnetic field is applied to the recording medium, a temperature at a position (recording point) where recording magnetization is reversed after thermal erasure becomes a temperature $T_1^*$ lower than the Curie temperature $T_C$. Therefore, the TMEW corresponds to a region of the recording medium heated to the temperature $T_1^*$ or more.

Thereafter, using the relationship between the laser power and the temperature of the recording medium, which has been obtained in S1, the recording medium is locally heated such that the temperature of the predetermined point becomes $T_2$ from $T_1$. Then, a TMEW is measured in the same way. At this time, if a recording magnetic field is evenly applied, the TMEW remains to correspond to the region heated to the temperature $T_1^*$ or more. However, the magnetic field sensed by the recording medium changes depending on a location thereof. In other words, a magnetic field at a position whose temperature is $T_1^*$ when the predetermined point is the temperature $T_2$ is different from a magnetic field at a position whose temperature is $T_1^*$ when the predetermined point is temperature $T_1$. Therefore, the temperature of the recording point is the temperature $T_2^*$ that is different from the temperature $T_1^*$, and the TMEW corresponds to a region of the recording medium heated to the temperature $T_2^*$ or more. In the example illustrated in FIG. 6, the temperature $T_2^*$ is higher than the temperature $T_1^*$; however, depending on a recording magnetic field gradient, the temperature $T_2^*$ may be lower than the temperature $T_1^*$.

In either case, the TMEW at the temperature $T_2$ is wider than that at the temperature $T_1$, so the recording point moves outward and changes by only $\Delta x^*$ as illustrated in FIG. 6. From the temperature change $\Delta_T(=T_2-T_1)$ of the recording medium and the change amount $\Delta x^*$ of the measured recording point, a temperature gradient $\Delta T/\Delta x^*$ of the recording medium in the state where a recording magnetic field is applied is estimated.

(Step S4) Next, using the temperature gradient of the recording medium in the nonmagnetic field state, which is measured in S2, and the temperature gradient of the recording medium in the state where the predetermined recording magnetic field is applied, which is measured in S3, a recording magnetic field gradient is calculated. Specifically, it is calculated as follows.

The change amount $\Delta x^*$ of the recording point measured in S3 is given as a sum of a change amount $\Delta x_T$ of the recording point due to the temperature gradient and a change amount $\Delta x_H$ of the recording point due to the magnetic field gradient by $$\Delta x^* = \Delta x_T + \Delta x_H \quad (3).$$

Also, $\Delta x_T$ and $\Delta x_H$ are respectively given by $$\Delta x_T = \frac{dx}{dT}\Delta T \quad (4)$$

$$\Delta x_H = \frac{dT}{dH_C} \cdot \frac{dH_h}{dx} \cdot \frac{dx}{dT}\Delta x_T. \quad (5)$$

Herein, $dH_C/dT$ is a temperature gradient of coercive force of the recording medium, and $dH_h/dx$ is a recording magnetic field gradient of the recording medium. Therefore, using the expressions (3)-(5), the recording magnetic field gradient $dH_h/dx$ is given by $$\frac{dH_h}{dx} = \left(\frac{dT}{dx} - \frac{\Delta T}{\Delta x^*}\right) \cdot \frac{dT}{dx} \cdot \frac{dH_C}{dT} \cdot \frac{\Delta x^*}{\Delta T}. \quad (6)$$

In the right side of the expression (6), $dH_C/dT$ has been obtained for each of materials of the recording medium in advance, and $dT/dx$ has been measured in S2 and $\Delta T/\Delta x^*$ has been measured in S3. Therefore, from the expression (6), the recording magnetic field gradient can be directly calculated.

Figure 7A:
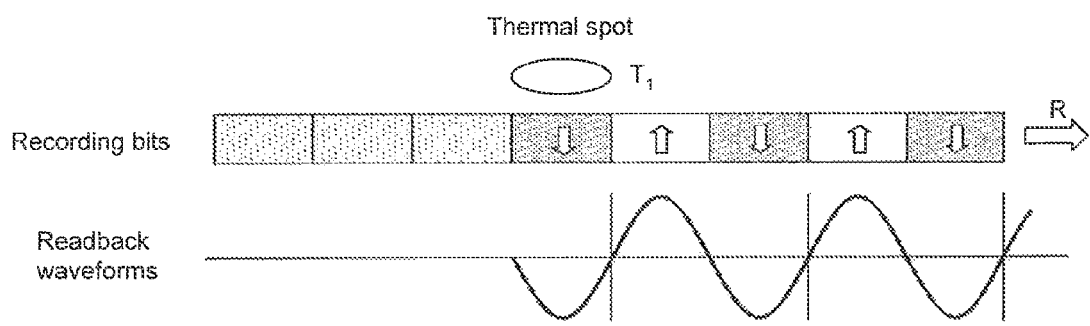
FIG. 7A and FIG. 7B are schematic views that illustrate situations where a zero crossing point of a readback waveform of the recording head changes due to a temperature increase.
Figure 7B:
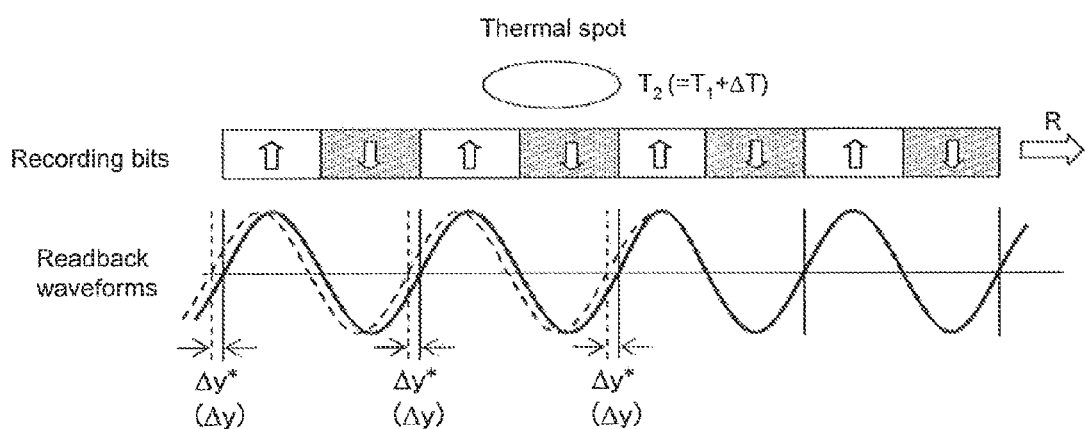

In the above-described method, the recording magnetic field gradient in the track width direction has been calculated, and in the same method, a magnetic field gradient in a track traveling direction (see an arrow R in FIG. 1) can also be calculated. In other words, as a temperature gradient of the recording medium, a temperature gradient of the recording medium in the track traveling direction is measured. Then, from the measurement value, a magnetic field gradient in the track traveling direction is calculated. For measurement of the temperature gradient of the recording medium in the track traveling direction, a change amount of a zero crossing point of a readback waveform of the recording head is used. FIG. 7A and FIG. 7B are schematic views that illustrate situations where a zero crossing point of a readback waveform changes due to a temperature increase.

When the predetermined point of the recording medium is heated from a state of the temperature $T_1$ illustrated in FIG. 7A to a state of the temperature $T_2$ illustrated in FIG. 7B, a recording magnetic domain size is enlarged due to the temperature increase. Therefore, a readback waveform is output as being deviated in the track traveling direction with reference to a readback waveform before the temperature increase. Using this, in the nonmagnetic field state and in the state where the predetermined recording magnetic field is applied from the magnetic head, respective change amounts $\Delta y$ and $\Delta y^*$ of zero crossing points of readback waveforms are measured. From the change amounts, a temperature gradient $dT/dy$ of the recording medium in the nonmagnetic field state and a temperature gradient $\Delta T/\Delta y^*$ of the recording medium in a state where the recording medium has a magnetic field gradient are respectively obtained. The recording magnetic field gradient $dH_h/dy$ in the track traveling direction is given in the same way as the expression (6) by $$\frac{dH_h}{dy} = \left(\frac{dT}{dy} - \frac{\Delta T}{\Delta y^*}\right) \cdot \frac{dT}{dy} \cdot \frac{dH_C}{dT} \cdot \frac{\Delta y^*}{\Delta T}. \quad (7)$$

As described above, a recording magnetic field gradient in the track traveling direction can also be directly calculated.

As one example, a recording magnetic field gradient is calculated as follows. From an experiment, the temperature gradient $dT/dx$ of the recording medium and the temperature gradient $dH_C/dT$ of coercive force of the recording medium are obtained, and are respectively 3.4 K/nm and $1.75 \times 10^4$ A/m·K (220 Oe/K). Also, when the temperature change $\Delta T$ is 20K, the change amount $\Delta x^*$ of the position (recording point) where recording magnetization is reversed is obtained and is 5.6 nm. From these values, using the expression (6), the recording magnetic field gradient $dH_h/dx$ can be obtained and is $-2.86 \times 10^{12}$ A/m$^2$ (−35.9 Oe/nm).

Furthermore, the recording magnetic field gradient that is experimentally calculated as described above, together with a recording magnetic field distribution by a calculator simulation, gives information of a relative position between the main magnetic pole layer of the magnetic head and the recording point (end part position of a magnetization transition width).

Figure 8:
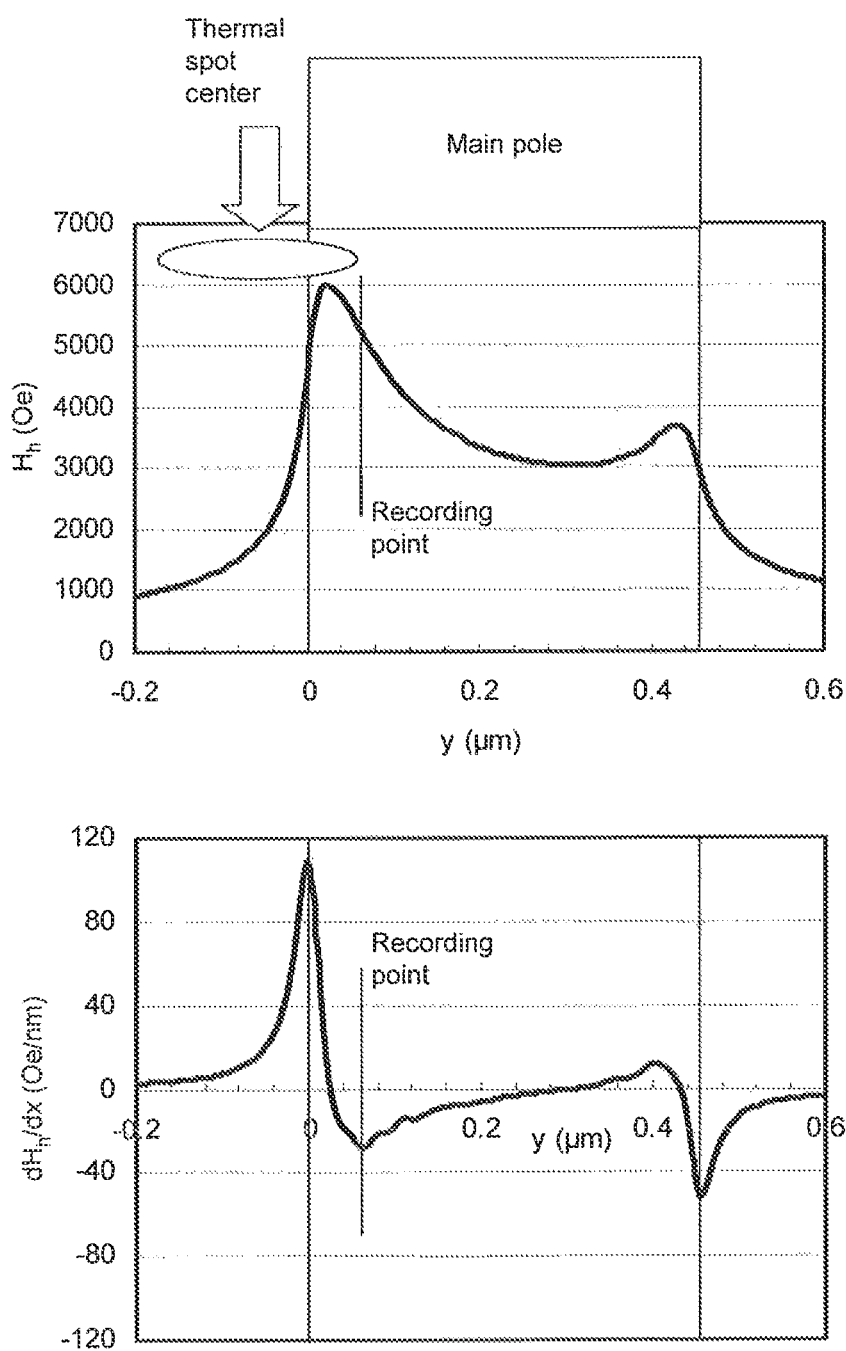
FIG. 8 is a drawing that illustrates one example of a simulation result of the recording magnetic field gradient and recording magnetic field, which is calculated using a finite element method.

FIG. 8 is a graph that illustrates an example of a simulation result of the recording magnetic field gradient and recording magnetic field, which is calculated using a finite element method. The horizontal axes indicate the distance in the track traveling direction from an end part of the main magnetic pole (main pole) layer of the magnetic head, and the lateral axes respectively indicate the recording magnetic field gradient at the position and the recording magnetic field at the position. It can be estimated that, from a comparison with the calculation result in FIG. 8, a position having the above-described recording magnetic field gradient ($-2.86 \times 10^{12}$ A/m$^2$ (35.9 Oe/nm)) is a position 16.7 nm inside from the end part of the main magnetic pole layer in the track traveling direction.

Information such as the recording magnetic field gradient, recording magnetic field, and recording point, etc., which are obtained as described above, can be used as diagnosis items for self-diagnosis of the magnetic disk device. Therefore, by periodically checking such information, defects and faults caused in the magnetic disk device can be detected early and predicted. Also, based on such information, magnetic recording operations of the magnetic disk device, for example, laser power of laser light for thermally-assisted magnetic recording and a current value for generating a recording magnetic field in the magnetic head, can be controlled.

While preferred embodiments of the present invention have been shown and described in detail, and it is to be understood that variety of changes and modifications may be made without departing from the spirit of scope of the following claims or its scope.

What is claimed is:

1. A measurement method of a magnetic field gradient of a recording magnetic field generated by a magnetic head in a recording medium, comprising:
    a step of locally heating the recording medium in a nonmagnetic field state where a magnetic field is not applied to the recording medium at all and measuring a temperature gradient of the recording medium in the nonmagnetic field state;

a step of locally heating the recording medium in a recording magnetic field application state where the recording magnetic field is applied to the recording medium and measuring a temperature gradient of the recording medium in the recording magnetic field application state;

a step of calculating a magnetic field gradient of the recording magnetic field based on the temperature gradient of the recording medium in the nonmagnetic field state and the temperature gradient of the recording medium in the recording magnetic field application state.

2. The measurement method of the magnetic field gradient according to claim 1, wherein where the temperature gradient of the recording medium in the nonmagnetic field state is dT/dx, the temperature gradient of the recording medium in the recording magnetic field application state is $\Delta T/\Delta x^*$, and a temperature gradient of coercive force of the recording medium is $dH_C/dT$, a magnetic field gradient $dH_h/dx$ of the recording magnetic field is calculated based on a following expression:

$$\frac{dH_h}{dx} = \left(\frac{dT}{dx} - \frac{\Delta T}{\Delta x^*}\right) \cdot \frac{dT}{dx} \cdot \frac{dH_C}{dT} \cdot \frac{\Delta x^*}{\Delta T}.$$

3. The measurement method of the magnetic field gradient according to claim 1, wherein the temperature gradient of the recording medium in the nonmagnetic field state and the temperature gradient of the recording medium in the recording magnetic field application state are measured in the track width direction, and the magnetic field gradient of the recording magnetic field is calculated in the track width direction.

4. The measurement method of the magnetic field gradient according to claim 3, wherein based on a temperature change of a width where a recording magnetic field of the recording medium is erased when the recording medium is locally heated, the temperature gradient of the recording medium in the nonmagnetic field state and the temperature gradient of the recording medium in the recording magnetic field application state are measured.

5. The measurement method of the magnetic field gradient according to claim 1, wherein the temperature gradient of the recording medium in the nonmagnetic field state and the temperature gradient of the recording medium in the recording magnetic field application state are measured in a track traveling direction, and the magnetic field gradient of the recording magnetic field is calculated in the track traveling direction.

6. The measurement method of the magnetic field gradient according to claim 5, wherein based on a temperature change of a zero crossing point of a readback waveform of the magnetic head when the recording medium is locally heated, the temperature gradient of the recording medium in the nonmagnetic field state and the temperature gradient of the recording medium in the recording magnetic field application state are measured.

7. A magnetic disk device, comprising:

a magnetic head provided with a magnetoresistive effect (MR) element and a magnetic pole layer that generates a recording magnetic field to a recording medium;

a light source that generates light for heating the recording medium; and a control unit that controls the magnetic head and the light source and performs the measurement method of the magnetic field gradient according to claim 1.

8. The magnetic disk device according to claim 7, wherein based on the measured magnetic field gradient of the recording magnetic field, the control unit performs self-diagnosis of the magnetic disk device.

9. The magnetic disk device according to claim 7, wherein based on the measured magnetic field gradient of the recording magnetic field, the control unit controls a magnetic recording operation of the magnetic disk device.

* * * * *